US 12,045,824 B2

(12) United States Patent
Weinflash (10) Patent No.: US 12,045,824 B2
(45) Date of Patent: Jul. 23, 2024

(54) SYSTEM AND METHOD FOR SIMPLIFYING FRAUD DETECTION IN REAL-TIME PAYMENT TRANSACTIONS FROM TRUSTED ACCOUNTS

(71) Applicant: Early Warning Services, LLC, Scottsdale, AZ (US)

(72) Inventor: Laura Weinflash, Scottsdale, AZ (US)

(73) Assignee: EARLY WARNING SERVICES, LLC, Scottsdale, AZ (US)

( * ) Notice: Subject to any disclaimer, the term of this patent is extended or adjusted under 35 U.S.C. 154(b) by 376 days.

(21) Appl. No.: 17/016,866

(22) Filed: Sep. 10, 2020

(65) Prior Publication Data
US 2022/0076264 A1 Mar. 10, 2022

(51) Int. Cl.
G06Q 20/40 (2012.01)
G06F 18/22 (2023.01)
G06N 7/02 (2006.01)
H04L 9/08 (2006.01)

(52) U.S. Cl.
CPC ......... G06Q 20/4016 (2013.01); G06F 18/22 (2023.01); G06N 7/02 (2013.01); H04L 9/0825 (2013.01); G06Q 2220/00 (2013.01); H04L 2209/56 (2013.01)

(58) Field of Classification Search
CPC ...... G06K 9/6215; G06N 7/02; H04L 9/0825; H04L 2209/56; G06Q 2220/00; G06Q 20/4016
USPC .......................................................... 705/75
See application file for complete search history.

(56) References Cited

U.S. PATENT DOCUMENTS

| | | | |
|---|---|---|---|
| 9,996,825 B1 | 6/2018 | Casey et al. | |
| 10,521,837 B1 * | 12/2019 | Mossoba et al. | |
| 11,055,727 B1 * | 7/2021 | Kumar | |
| 2003/0101096 A1 | 5/2003 | Suzuki et al. | |
| 2007/0174214 A1 | 7/2007 | Welsh et al. | |
| 2012/0239557 A1 * | 9/2012 | Weinflash et al. | |
| 2012/0284175 A1 | 11/2012 | Wilson et al. | |
| 2014/0108251 A1 | 4/2014 | Anderson et al. | |
| 2014/0372301 A1 | 12/2014 | Anamanamuri | |
| 2015/0066765 A1 * | 3/2015 | Banks et al. | |

(Continued)

FOREIGN PATENT DOCUMENTS

WO WO2020065242 A1 * 4/2020

*Primary Examiner* — Neha Patel
*Assistant Examiner* — Yin Y Choi
(74) *Attorney, Agent, or Firm* — BRYAN CAVE LEIGHTON PAISNER LLP (57) ABSTRACT

A system including one or more processors and one or more non-transitory computer-readable media storing computing instructions configured to run on the one or more processors and perform various acts. The acts can include: (a) receiving a payment authorization, through a network, from a sender financial institution; (b) obtaining, in real-time after receiving the payment authorization, a sender status based on sender information of the payment authorization; (c) when the sender status is preauthorized, instructing, through the network and in real-time after obtaining the sender status, a recipient financial institution to bypass a transaction fraud detection mechanism; and (d) instructing, through the network, the recipient financial institution to post a payment amount of the payment authorization to a recipient account in real-time. Other embodiments are described.

20 Claims, 6 Drawing Sheets

(56) References Cited

U.S. PATENT DOCUMENTS

| | | |
|---|---|---|
| 2015/0206107 A1 | 7/2015 | Chen et al. |
| 2015/0278816 A1 | 10/2015 | Fleishman et al. |
| 2016/0086158 A1 | 3/2016 | Yu et al. |
| 2016/0247134 A1* | 8/2016 | Kimberg et al. |
| 2017/0357954 A1* | 12/2017 | Tribble et al. |
| 2018/0101848 A1* | 4/2018 | Castagna et al. |
| 2018/0174117 A1 | 6/2018 | Parekh et al. |
| 2019/0073675 A1 | 3/2019 | Anamanamuri |
| 2020/0219103 A1* | 7/2020 | Mandloi |
| 2021/0035106 A1* | 2/2021 | Lin et al. |

* cited by examiner

SYSTEM AND METHOD FOR SIMPLIFYING FRAUD DETECTION IN REAL-TIME PAYMENT TRANSACTIONS FROM TRUSTED ACCOUNTS

TECHNICAL FIELD

This disclosure relates generally to financial transaction processing, and relates more particularly to fraud prevention in real-time payment transactions and networks.

BACKGROUND

Users choose real-time electronic payment transactions because the recipients can receive payments almost immediately. However, financial institutions, either on the sender side or the recipient side, are generally required by law to adopt various fraud detection mechanisms. Financial institutions on the recipient side typically adopt fraud detection mechanisms that are configured to not only detect frauds originated from or caused by accounts that they maintained but also frauds originated from or caused by accounts on the sender side, even though the transactions have cleared the fraud detection by the senders' financial institutions. These duplicate efforts slow down the real-time electronic payment process. It is thus desired to have a system or method for simplifying fraud detection in real-time electronic payment transactions where a sender account does not have to go through fraud detection twice, at least when the sender account is known to be owned by a prestigious or trusted owner. Further, because sender financial institutions are generally in a better position to determine whether the sender accounts are trustworthy, it is desired that the system or method simplifies the fraud detection against the sender accounts on the end of recipient financial institutions.

BRIEF DESCRIPTION OF THE DRAWINGS

To facilitate further description of the embodiments, the following drawings are provided in which.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, five seconds, ten seconds, thirty seconds, one minute, or five minutes.

DESCRIPTION OF EXAMPLES OF EMBODIMENTS

Various embodiments include a system comprising one or more processors and one or more non-transitory computer-readable media storing computing instructions configured to run on the one or more processors and perform certain acts to simplify fraud detection in real-time payment transactions from trusted accounts. The acts can include: (a) receiving a payment authorization, through a network, from a sender financial institution, the payment authorization comprising a payment amount, a recipient account identifier for a recipient account maintained by a recipient financial institution, and sender information; (b) obtaining, in real-time after receiving the payment authorization, a sender status based on the sender information; (c) when the sender status is preauthorized, instructing, through the network and in real-time after obtaining the sender status, the recipient financial institution to bypass a transaction fraud detection mechanism; and (d) instructing, through the network, the recipient financial institution to post the payment amount to the recipient account in real-time.

With the recipient financial institution following the instruction and bypassing the fraud detection mechanism(s) related to senders, payment transactions from a preauthorized sender can be processed faster and less likely to be rejected by the recipient financial institution when the recipient financial institution is not as familiar with the sender or the sender's business as the sender financial institution. This approach of shifting the burden of fraud detection against senders to the system and/or the sender financial institution is advantageous because the system and the sender financial institution generally have more information about the senders and sender accounts, including the account history, past transactions, etc. and thus are in a better position to perform sender-related fraud detection.

In many embodiments, the system can be different from the sender financial institution and the recipient financial institution, and the system can be configured to facilitate real-time payment transactions between financial institutions. Examples of the real-time payment transactions can include electronic fund transfers between friends for splitting bills, electronic payments from insurers to individuals for settling insurance claims, or online bill payments from customers to utility providers. The payment authorization can be generated, by a sender device or the sender financial institution, based on a payment instruction by a user (e.g., the sender) associated with a sender account maintained by the sender financial institution. The sender information can comprise a sender account identifier for, and associated with, the sender account.

In a number of embodiments, an account identifier can be uniquely associated with a user account at a financial institution while the user account can be associated with one or more account identifiers. For instance, the account identifier for a bank account owned by a user can be a public key linked to the bank account of the user, such as a personal email, a work email, a home phone number, a cell phone number, etc., and the bank account, on the other hand, can be associated with more than one public keys.

In some embodiments, the sender status can be determined by the sender financial institution, while in some embodiments, the sender status can be determined by the system. In a number of embodiments, when the sender information comprises the sender status determined by the sender financial institution, the system can be configured to obtain the sender status by retrieving the sender status from the sender information.

In some embodiments, the system can be configured to obtain the sender status by: (a) determining whether the sender information matches one or more sender records in a preapproved sender database; (b) when the sender information matches an associated sender record of the one or more sender records in the preapproved sender database, determining that the sender status is preauthorized; and (c) when the sender information does not match the one or more sender records in the preapproved sender database, determining that the sender status is not preauthorized. In a number of embodiments, the preapproved sender database can be stored in a local storage device coupled to the system or accessible, remotely via the network, to the system. In several embodiments, the one or more sender records in the preapproved sender database can be maintained and operated by a preapproved sender database operator, and the preapproved sender database operator can be at least one of the system, the sender financial institution, the recipient financial institution, or a trusted third-party institution. In some embodiments, a sender can apply to have the sender's one or more accounts added in the preapproved sender database, and if the preapproved sender database operator approves such application, after fraud detection is cleared, the preapproved sender database operator can add one or more sender records associated with the sender's one or more accounts in the preapproved sender database.

In several embodiments, the sender information also can include a public key uniquely associated with the sender account, such as the aforementioned sender account identifier, e.g., a phone number or an email address. In some embodiments, a sender account can be associated with one or more public keys while each public key of the one or more public keys can be associated with only the sender account, but no other sender accounts. In a number of embodiments, when none of the sender records in the preapproved sender database is associated with the public key for the sender, the system can be configured to determine that the sender status is not preauthorized. In some embodiments where the sender information includes a sender public key, the system can be configured to determine whether the sender information matches the one or more sender records in the preapproved sender database by: (a) when a candidate sender record of the one or more sender records is associated with the sender public key: (i) using the candidate sender record as the associated sender record; and (ii) determining that the sender information matches the associated sender record; and (b) when none of the one or more sender records is associated with the sender public key, determining that the sender information does not match the one or more sender records.

In similar or other embodiments, the system can be configured to determine whether the sender information matches the one or more sender records in the preapproved sender database by: (a) for each candidate sender record of the one or more sender records: (i) applying fuzzy logic to determine a respective similarity measurement between the sender information and the each candidate sender record; and (ii) when the respective similarity measurement is not less than the predetermined threshold score (e.g., 95%, or 98%), using the candidate sender record as the associated sender record, and determining that the sender information matches the associated sender record; and (b) when a respective similarity measurement between the sender information and each of the one or more sender records is less than a predetermined threshold score, determining that the sender information does not match the one or more sender records.

In a number of embodiments, the fuzzy logic can be any suitable mechanism, including software components and/or hardware components of the system, configured to determine a similarity measurement between multi-attribute records. In some embodiments, each of the one or more sender records can comprise one or more of attributes, such as an account type, a first name, a middle name, a last name, a company name, a social security number, a tax identification, a mailing address, a public key, a primary phone number, a secondary phone number, a primary email address, a secondary email address, and so forth, and the sender information also can comprise one or more of attributes, such as a sender account identifier, a first name, a middle name, a last name, an email address, a phone number, a mailing address, etc. An exemplary fuzzy logic adopted in an embodiment for determining the similarity measurement can include one or more of: (a) a linguistic interpreter configured to assign a numerical value to a non-numerical attribute or to a pair of non-numerical attributes; and (b) a mathematical module configured to determine a respective similarity measurement for each pair of corresponding attributes based on the numerical values of each attribute, as well as an overall similarity measurement based on respective similarity measurement for each pair of corresponding attributes.

For instance, in an embodiment, the linguistic interpreter of the fuzzy logic can be configured to determine, in real-time, a similarity measurement between corresponding attributes of the sender information and the candidate sender record based on predetermined linguistic rules. The linguistic interpreter further can be configured to be case sensitive or insensitive, substitute potential abbreviations, and/or correct any potential typos in the texts, etc. For example, the linguistic interpreter can determine that the similarity measurement between "ALEX" and "Alexander" is 0.99 or 99% because according to a dictionary including abbreviations, Alex can be an abbreviation of Alexander and that the similarity measurement between "Cartar" and "Carter" is 0.83 or 83% because "Cartar" is very likely a typo of "Carter" when "Carter" is the closest word in the dictionary. In another embodiment, the linguistic interpreter also can include a machine-learning linguistic system configured to constantly update the predetermined linguistic rules.

Further, the overall similarity measurement between the sender information and the candidate sender record in an embodiment can be determined by an average score based on a weighted similarity measurement of each non-empty field. An exemplary formula for determining the similarity measure in this embodiment can be as below:

$$\frac{\sum_{n=1}^{m}(w_n \times S_n)}{\sum_{n=1}^{m}(w_n)}$$

Where:
m: the number of attributes that are not empty in both the sender information and the candidate sender record, $1 \leq m \leq N-1$, and N is the total number of attributes of the candidate sender record;

$S_n$: a similarity measurement of the n-th attribute of the candidate sender record, Sn; and $w_n$: a predetermined weight of the n-th attribute of the candidate sender record, $0 < w_n < 1$.

In a number of embodiments, when the sender status is preauthorized, the system can be configured to instruct the recipient financial institution, via the network, to bypass the transaction fraud detection mechanism prior to, or concurrently with, submitting the instruction to the recipient financial institution, through the network, to post the payment amount to the recipient account in real-time. In similar or other embodiments, the recipient financial institution can be configured to rely solely on the instruction from the system to bypass the transaction fraud detection mechanism and skip any fraud detection mechanism related to senders that the recipient financial institution generally performs. The recipient financial institution can, however, perform other types of fraud detection mechanism(s) not related to senders, if any.

In some embodiments, the predetermined threshold score can be a fixed figure. In other embodiments, the predetermined threshold score can vary depending on the recipient financial institution. For instance, a first recipient financial institution can require a similarity measurement no less than 99% before the system is allowed to instruct the first recipient financial institution to bypass its transaction fraud detection mechanism while a second recipient financial institution can require a similarity measurement of at least 97%. In a number of embodiments, an instruction from the system to the recipient financial institution to bypass the transaction fraud detection mechanism further can include the similarity measurement between the sender information and the associated sender record for the recipient financial institution to confirm that the similarity measurement is sufficient.

In a number of embodiments, the payment authorization further can comprise recipient information. In similar or other embodiments, the system can be configured to verify, in real-time after receiving the payment authorization, whether the recipient account identifier is associated with an intended recipient account based on the recipient information. In some embodiments, in order to verify the association between the recipient account identifier and the intended recipient account, the system further can be configured to perform: (a) submitting, via the network, the recipient account identifier and the recipient information of the payment authorization to the recipient financial institution; and (b) requesting a recipient verification result, via the network, from the recipient financial institution.

In some embodiments, the system further can comprise computing instructions for verifying the association between the recipient account identifier and the intended recipient account by performing: (a) determining a recipient verification score based on the recipient information and a user record associated with the recipient account identifier; and (b) when the recipient verification score is below a predetermined threshold score, reporting an error message to the sender financial institution. The user record associated with the recipient account identifier can be at least one of maintained by the system or obtained by the system, via the network, from the recipient financial institution. In some embodiments, for determining the recipient verification score, the system also can be configured to apply fuzzy logic to determine a similarity measurement between the recipient information and the user record. The fuzzy logic used here can be similar or identical to any one of the aforementioned exemplary fuzzy logics adopted for determining the similarity measurement between the sender information and the candidate sender record.

In a number of embodiments, the payment authorization from the sender financial institution further can comprise a promise-to-pay message provided by the sender financial institution. The sender financial institution can be configured to provide the promise-to-pay message after the sender financial institution successfully verifies the sender account for the payment amount. The sender financial institution can verify that the sender has an account, such as a checking account or a saving account, with sufficient fund at the sender financial institution, before submitting the payment authorization to the system. In addition, the sender financial institution can be configured to debit the sender account maintained by the sender financial institution for the payment amount, plus any applicable fees, before transmitting the payment authorization. In many embodiments, a successful debit of the sender account by the sender financial institution can be part of the successful sender account verification. Furthermore, the sender financial institution also can perform one or more of fraud prevention acts associated with the sender account and/or the recipient account or the recipient account identifier. In some embodiments, the sender financial institution further can skip the fraud detection acts, if any, associated with sender accounts when the sender accounts are trusted/preauthorized accounts.

Various embodiments comprise a method implemented via execution of computing instructions configured to run at one or more processors and stored at one or more non-transitory computer-readable media for simplifying fraud detection in real-time payment transactions from trusted accounts. In a number of embodiments, the method can comprise: (a) receiving a payment authorization, through a network, from a sender financial institution, the payment authorization comprising a payment amount, a recipient account identifier for a recipient account maintained by a recipient financial institution, and sender information; (b) obtaining, in real-time after receiving the payment authorization, a sender status based on the sender information; (c) when the sender status is preauthorized, instructing, through the network and in real-time after obtaining the sender status, the recipient financial institution to bypass a transaction fraud detection mechanism; and (d) instructing, through the network, the recipient financial institution to post the payment amount to the recipient account in real-time. In various embodiments, the steps of obtaining the sender status and/or instructing the recipient financial institution according to the sender status can be similar or identical to the one or more acts of the systems described above.

Figure 1:
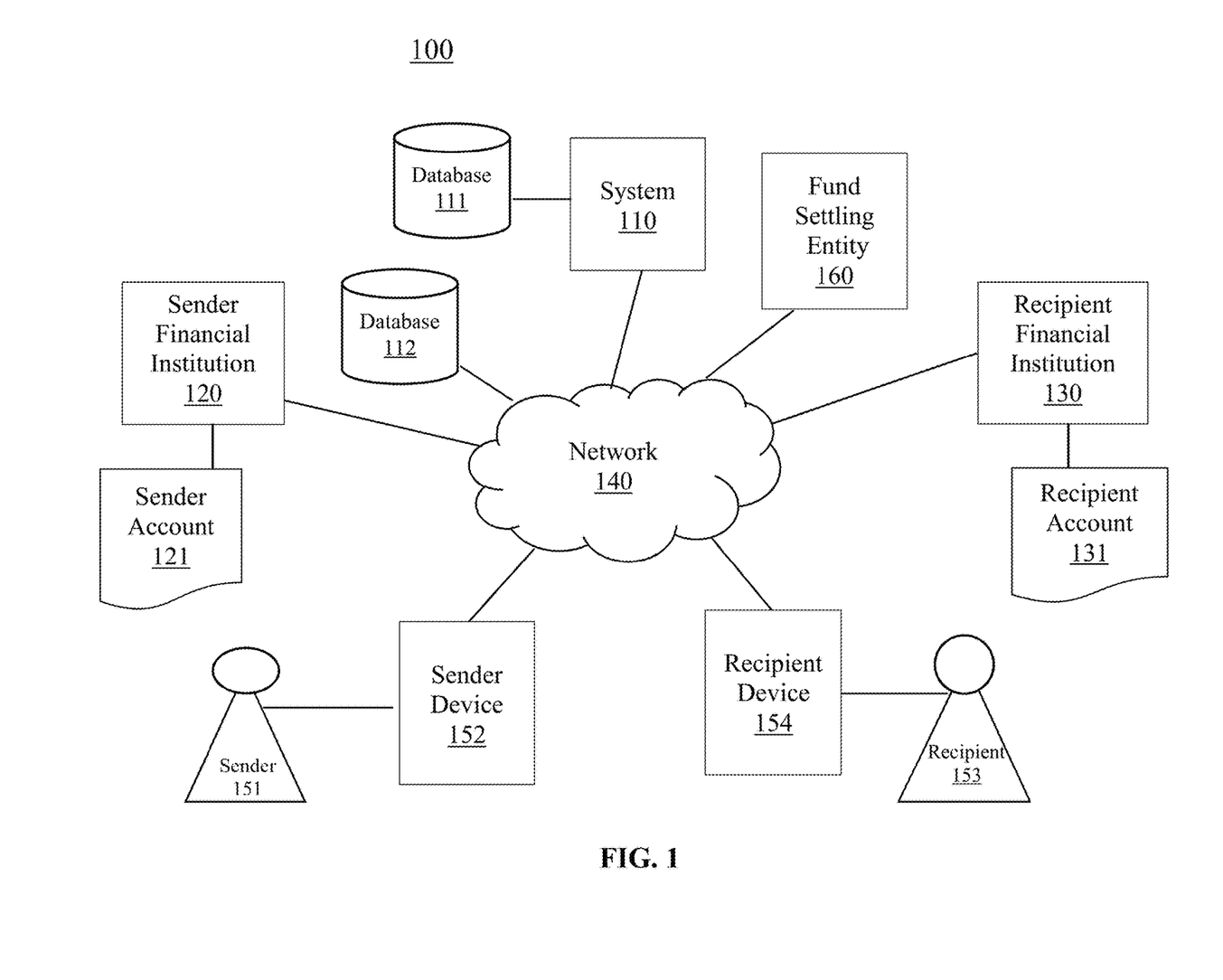
FIG. 1 illustrates a block diagram of a system that can be employed for simplifying fraud detection procedures in real-time payment transactions from trusted accounts, according to an embodiment.

Turning to the drawings, FIG. 1 illustrates a block diagram of a system 100 that can be employed for a real-time payment transaction network, according to an embodiment. System 100 is merely exemplary, and embodiments of the system are not limited to the embodiments presented herein. System 100 can be employed in many different embodiments or examples not specifically depicted or described herein. In some embodiments, certain elements, modules, subsystems, or systems of system 100 can perform various procedures, processes, and/or activities. In other embodiments, the procedures, processes, and/or activities can be performed by other suitable elements, modules, subsystems, or systems of system 100.

In some embodiments, system 100 can include one or more systems, such as a system 110, one or more databases, such as database 111 and/or database 112, one or more sender financial institutions, such as sender financial institution 120, one or more recipient financial institutions, such as recipient financial institution 130, a plurality of accounts, such as sender account 121 and/or recipient account 131, one or more user computing devices, such as sender device 152 of sender 151 and/or recipient device 154 of recipient 153, and/or one or more fund settling entities, such as fund settling entity 160. In a number of embodiments, system 110 can include one or more modules, subsystems, and/or systems.

In a number of embodiments, system 110 can be configured to perform one or more of the following acts: (a) receiving a payment authorization, through network 140, from sender financial institution 120, the payment authorization comprising a payment amount, a recipient account identifier for recipient account 131 maintained by recipient financial institution 130, and sender information; (b) obtaining, in real-time after receiving the payment authorization, a sender status based on the sender information; (c) when the sender status is preauthorized, instructing, through network 140 and in real-time after obtaining the sender status, recipient financial institution 130 to bypass a transaction fraud detection mechanism; and/or (d) instructing, through network 140, recipient financial institution 130 to post the payment amount to recipient account 131 in real-time.

In some embodiments, the payment authorization is authorized by sender 151, via sender device 152, and provided to system 110 by sender financial institution 120. The payment authorization can comprise the payment amount, the recipient account identifier for recipient account 131 maintained by recipient financial institution 130, the sender information, such as a sender account identifier for sender account 121 and the name of sender 151, and/or other information, such as a promise-to-pay message to recipient financial institution 130, a reason for this transaction, a message from sender 151 to recipient 153, and/or additional information about recipient 153, including a name, an address, a tax identification (the tax ID) such as an Employer Identification Number (EIN) or an Individual Taxpayer Identification Number (TIN), a social security number, and/or a driver license number, etc.

In some embodiments, the sender status can be determined by sender financial institution 120, while in some embodiments, the sender status can be determined by system 110. In a number of embodiments, when the sender information comprises the sender status determined by sender financial institution 120, system 110 can be configured to obtain the sender status by retrieving the sender status from the sender information. In some embodiments, system 110 further can be configured to obtain the sender status by: (a) determining whether the sender information matches one or more sender records in a preapproved sender database (e.g., database 111 or database 112); (b) when the sender information matches an associated sender record of the one or more sender records in the preapproved sender database (e.g., database 111 or 112), determining that the sender status is preauthorized; and (c) when the sender information does not match the one or more sender records in the preapproved sender database (e.g., database 111 or database 112), determining that the sender status is not preauthorized. In a number of embodiments, system 110 can be configured to obtain the sender status from the sender information provided by sender financial institution 110, if any, and when the sender status is not found in the sender information, system 110 can be configured to determine the sender status based on data associated with sender account 121, including adopting the aforementioned steps.

In a number of embodiments, the preapproved sender database can be stored in a local storage device coupled to system 110, such as database 111, or accessible remotely via network 140 to system 110, such as database 112. In several embodiments, the one or more sender records in the preapproved sender database (e.g., database 111 or 112) can be maintained and operated by at least one of system 110, sender financial institution 120, recipient financial institution 130, or a trusted third-party institution.

In some embodiments, system 110 can be a financial institution, an inter-financial-institution payment network, a third-party real-time payment processor, etc. In a number of embodiments, system 110 can be configured to: (a) store account identifiers (e.g., public keys) for accounts at financial institutions, such as sender account 121 at sender financial institution 120 and/or recipient account 131 at recipient financial institution 130; and/or (b) coordinate with the financial institutions, such as sender financial institution 120 and/or recipient financial institution 130, and/or one or more fund settling entities, such as fund settling entity 160, to facilitate real-time payment transactions between the account holders, such as sender 151 and recipient 153. In many embodiments, the matching between a public key of an account holder and its corresponding account number at a financial institution can be unique. Examples of a public key of an account holder can include an email address, a phone number, a machine readable code, and so forth.

Further, in many embodiments, the one or more fund settling entities, such as fund settling entity 160, can be configured to perform the fund settlement involving transferring the payment amount debited from sender account 121 maintained by sender financial institution 120 to recipient account 131 maintained by recipient financial institution 130. Examples of fund settling entity 160 can include an Automated Clearing House (ACH), a wire transfer network, a credit/debit card network, etc.

Figure 5:
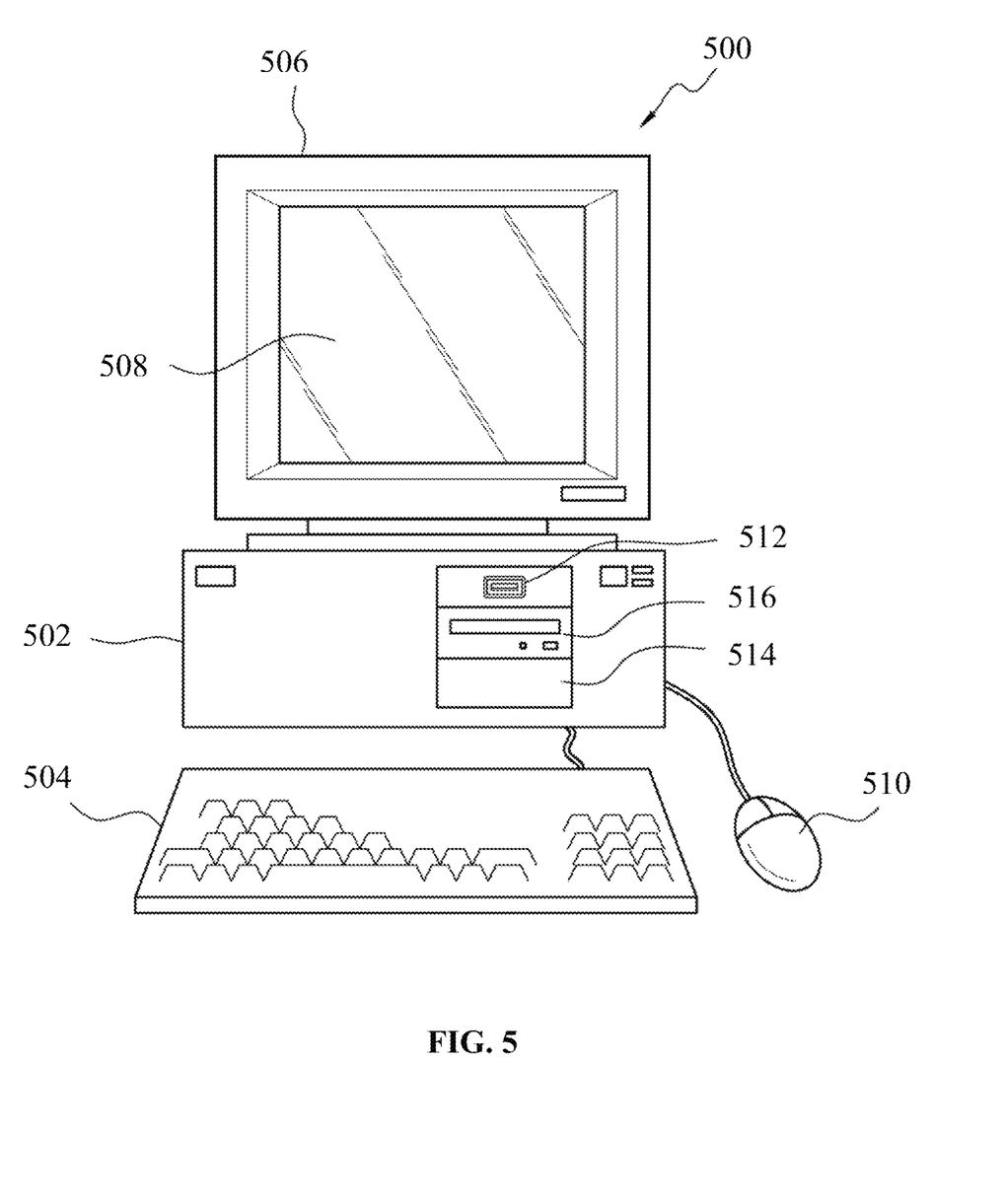
FIG. 5 illustrates a computer that is suitable for implementing an embodiment of components of the system of FIG. 1.

In a number of embodiments, each of the one or more systems, the financial institutions, the one or more user computing devices, and the one or more fund settling entities can be or include a computer system, such as computer system 500, as shown in FIG. 5 and described below, and can be a single computer, a single server, or a cluster or collection of computers or servers, or a cloud of computers or servers. In many embodiments, various components (e.g., 110, 120, 130, 152, 154, and/or 160) of system 100 can be in data communication with various other components (e.g., 110, 120, 130, 152, 154, and/or 160) of system 100, such as through one or more computer networks (e.g., network 140). The computer networks can be the Internet and/or other suitable data communication networks.

Still referring to FIG. 1, in various embodiments, system 110 can be a computer system comprising one or more processors and one or more non-transitory computer-readable media storing computing instructions configured to run on the one or more processors and perform one or more acts for simplifying fraud detection in real-time payment transactions between one or more senders, such as sender 151, and one or more recipients, such as recipient 153, similar to the various acts in previous examples. In some embodiments, sender 151 can be a buyer of a product offered for sale by a seller (e.g., recipient 153) or an insurer paying recipient 153 to settle a claim.

In some embodiments, certain elements, modules, subsystems, or systems of system 110, can perform various procedures, processes, and/or activities. In other embodiments, the procedures, processes, and/or activities can be performed by other suitable elements, modules, subsystems, or systems of system 100 and/or system 110. In many embodiments, the elements, modules, subsystems, or systems of system 100 and/or system 110 each can be implemented by a various number of suitable software components, hardware components, or combinations thereof. Examples of the elements, modules, subsystems, or systems of system 100 and/or system 110 can include a processing system configured to execute computing instructions, a network system configured to transmit and receive data to or from network 140, an external service system configured to interface with one or more external services, computers, or servers, such as sender financial institution 120, recipient financial institution 130, sender device 152, recipient device 154, and/or fund settling entity 160, and so forth. In some embodiments, the elements, modules, subsystems, or systems of system 100 and/or system 110 each can comprise one or more subsystems. For example, a single system of system 100 and/or system 110 can comprise a processing subsystem and a network subsystem.

Figure 2:
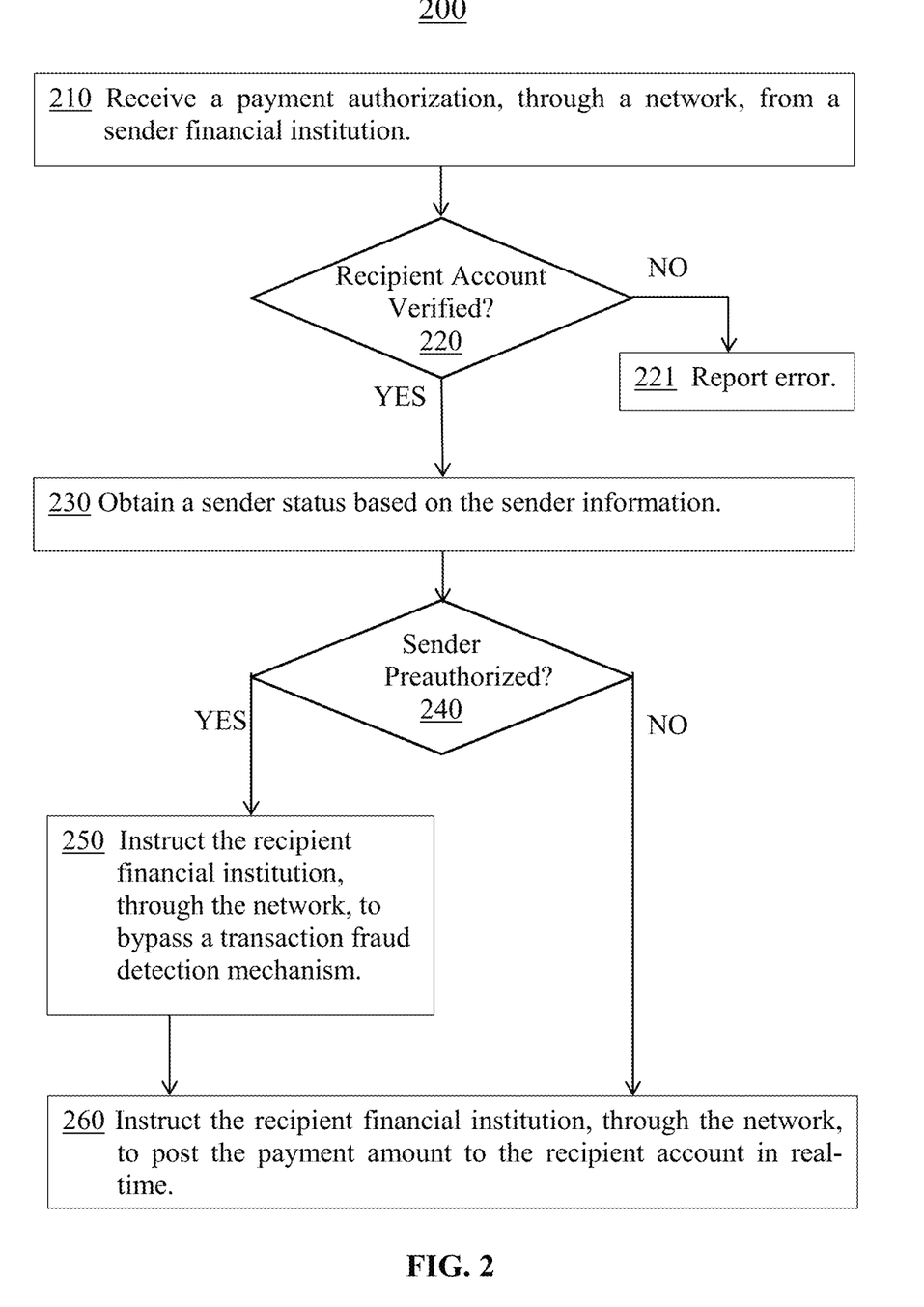
FIG. 2 illustrates a flow chart for a method for simplifying fraud detection procedures in real-time payment transactions from trusted accounts, according to an embodiment.

Turning ahead in the drawings, FIG. 2 illustrates a flow chart for a method 200, according to an embodiment. In some embodiments, method 200 can be a method of facilitating fraud preventions in real-time payment transactions. Method 200 is merely exemplary and is not limited to the embodiments presented herein. Method 200 can be employed in many different embodiments or examples not specifically depicted or described herein. In some embodiments, the procedures, the processes, and/or the activities of method 200 can be performed in the order presented. In other embodiments, the procedures, the processes, and/or the activities of method 200 can be performed in any suitable order. In still other embodiments, one or more of the procedures, the processes, and/or the activities of method 200 can be combined or skipped. In some embodiments, method 200 can be performed by one or more of system 100 and/or system 110 (FIG. 1).

Referring to FIG. 2, in some embodiments, method 200 can optionally include one or more acts performed by a system. Specifically, method 200 can include a block 210 of receiving, by the system, a payment authorization, through a network, from a sender financial institution. The system can be similar or identical to system 100 and/or system 110 (FIG. 1). The network can be similar or identical to network 140 (FIG. 1). The sender financial institution can be similar or identical to sender financial institution 120 (FIG. 1). The system can be different from the sender financial institution.

In several embodiments, the payment authorization can comprise a payment amount, a recipient account identifier (e.g., a public key of the recipient) for a recipient account, and/or sender information. In some embodiments, the recipient account identifier can be maintained by a recipient financial institution and uniquely associated with the recipient account of a recipient. The recipient account can be similar or identical to recipient account 131 (FIG. 1). The recipient can be similar or identical to recipient 153 (FIG. 1). The recipient financial institution can be similar or identical to recipient financial institution 130 (FIG. 1). The recipient financial institution can be different from the system and the sender financial institution. Further, the payment authorization can be initiated and authorized by a sender via a sender device, and be communicated, via the network, to the sender financial institution. The sender device can be similar or identical to sender device 152 (FIG. 1).

In some embodiments, the payment authorization from the sender financial institution in block 210 further can include one or more of: a promise-to-pay message by the sender financial institution to the recipient financial institution; a reason for the payment transaction; or additional identifying information about the recipient, such as a name, an address, a passport number, a driver license number, a social security number, and so forth.

In a number of embodiments, the payment authorization further can comprise recipient information, such as the additional identifying information about the recipient as described above, and method 200 can include a block 220 of verifying the recipient account by the system. In some embodiments, method 200 can include a block 221 of reporting, by the system, an error message to the sender financial institution when the recipient account is not verified. Verifying the recipient account can include determining, by the system or by the recipient financial institution, whether the information associated with the recipient account, maintained by the system and/or the recipient financial institution, matches the recipient information of the payment authorization provided by the sender. In some embodiments, in order to verify the recipient account, block 220 can include one or more the steps of: (a) submitting the recipient account identifier and the recipient information of the payment authorization, by the system via the network, to the recipient financial institution; (b) requesting a recipient verification result, by the system via the network, from the recipient financial institution; and/or (c) requesting a recipient verification score and/or information associated with the recipient account identifier, by the system via the network, from the recipient financial institution.

In some embodiments, block 220 can comprise determining, by the system in real-time after receiving the payment authorization, a recipient verification score. The recipient account can be considered verified when the recipient verification score exceeds, or at least equals to, a predetermined threshold score, such as 95% or 4 out of 5, etc. The recipient verification score can be determined by applying a fuzzy logic for determining a similarity measurement between the recipient information and a user record associated with the recipient account identifier. The fuzzy logic can be similar or identical to the exemplary fuzzy logic described above. The user record can be retrieved from a database based on the recipient account identifier of the payment authorization. The database can be similar or identical to database 111 (FIG. 1) or database 112 (FIG. 1). The user record also can be obtained by the system by requesting, via the network, the user record from the recipient financial institution based on the recipient account identifier.

In several embodiments, method 200 additionally can include a block 230 of obtaining, in real-time after the recipient account is verified, a sender status based on the sender information of the payment authorization. In a number of embodiments, when the sender information comprises the sender status determined by the sender financial institution, the system can be configured to obtain the sender status by retrieving the sender status from the sender information. In some embodiments, the system can be configured to obtain the sender status by determining whether the sender information corresponds to one or more sender record in a preapproved sender database. The preapproved sender database can be similar or identical to database 111 (FIG. 1) or database 112 (FIG. 1). The system can be configured to determine that the sender information corresponds to a sender record in the preapproved sender database when the sender information comprises a sender public key that matches a public key of the sender record. The system also can be configured to determine whether the sender information corresponds to any sender record in the preapproved sender database based on a method similar or identical to method 300 (FIG. 3), or one or more steps thereof, to be provided below. In a number of embodiments, the system can be configured to obtain the sender status from the sender information provided by the sender financial institution, and when the sender status is not found in the sender information, the system further can be configured to determine the sender status based on a method similar or identical to method 300 (FIG. 3), or one or more steps thereof, to be provided below.

In several embodiments, method 200 can include a block 240 of determining by the system whether the sender is preapproved based on the sender status. When the sender is preapproved, method 200 further can comprise a block 250 of instructing the recipient financial institution, by the system (e.g., 110 (FIG. 1) through the network, to bypass a transaction fraud detection mechanism associated with senders. The recipient financial institution typically can adopt one or more transaction fraud detection mechanisms configured to prevent various fraudulent transactions against senders, receivers, and/or the financial institution, such as merchant-based fraud by money laundering or transaction laundering, consumer fraud, credit card fraud, etc. In some embodiments, upon the receipt of an instruction to bypass a transaction fraud detection mechanism in block 250, the recipient financial institution can skip all fraud detection measures. In a number of embodiments, the recipient financial institution can bypass one or more types of transaction fraud detection mechanisms, such as sender-related fraud detection mechanisms, as instructed by the system in block 250, while performing other types of transaction fraud detection mechanism(s).

In a number of embodiments, method 200 can include a block 260 of instructing the recipient financial institution, by the system through the network, to post the payment amount to the recipient account in real-time. When the sender is preapproved, the instructions to the recipient financial institution in block 250 and block 260 can be submitted to the recipient financial institution in a single message or command.

Figure 3:
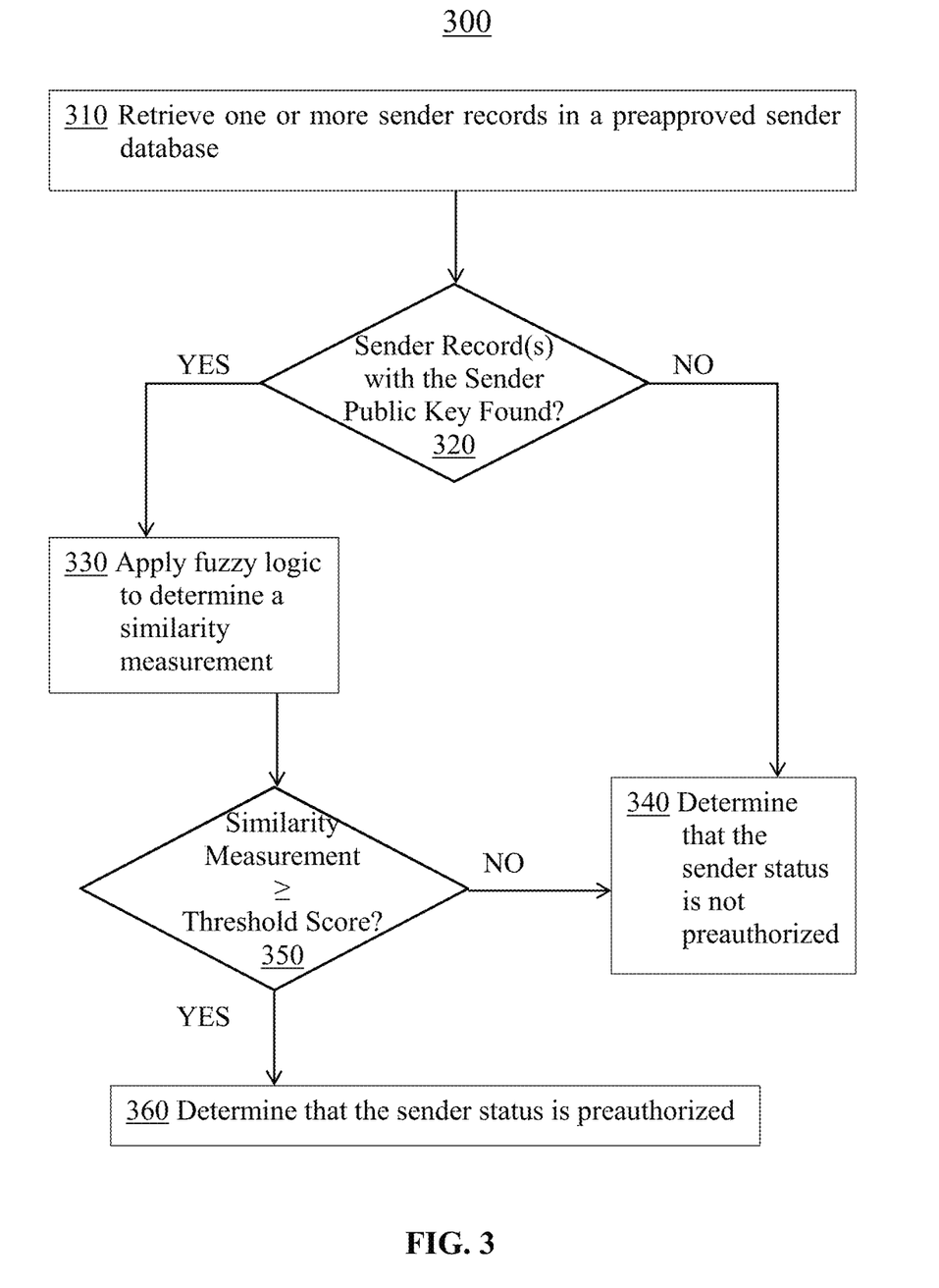
FIG. 3 illustrates a flow chart for a method for determining whether the sender account of a payment transaction is trusted, according to an embodiment.

Turning ahead in the drawings, FIG. 3 illustrates a flow chart for a method 300, according to an embodiment. In some embodiments, method 300 can be a method of obtaining a sender status. The sender status can be obtained based on sender information of a payment authorization. Method 300 is merely exemplary and is not limited to the embodiments presented herein. Method 300 can be employed in many different embodiments or examples not specifically depicted or described herein. In some embodiments, the procedures, the processes, and/or the activities of method 300 can be performed in the order presented. In other embodiments, the steps, the procedures, the processes, and/ or the activities of method 300 can be performed in any suitable order. In still other embodiments, one or more of the procedures, the processes, and/or the activities of method 300 can be combined or skipped. In some embodiments, method 300 can be performed by one or more of system 100 (FIG. 1) and/or system 110 (FIG. 1).

Referring to FIG. 3, method 300 can include a block 310 of retrieving, by a system, one or more sender records in a preapproved sender database. The system can be similar or identical to system 100 (FIG. 1) or system 110 (FIG. 1). The preapproved sender database can be similar or identical to database 111 (FIG. 1) or database 112 (FIG. 1). The one or more sender records can be obtained based on the sender information. In some embodiments, one or more sender records can be obtained based a sender public key of a sender. The sender can be similar or identical to sender 151 (FIG. 1). The sender public key can be similar or identical to any of the exemplary public keys provided above, including an email, a phone number, etc. In a number of embodiments, a sender public key is uniquely associated with a sender account, and the sender public key thus can be associated with at most one sender record in the preapproved sender database.

In some embodiments, method 300 further can include a block 320 of determining whether the one or more sender records associated with the sender information exist in the preapproved sender database. When block 320 determines that there is a sender record in the preapproved sender database associated with the sender public key in the preapproved sender database, method 300 can include a block 330 of the system applying a fuzzy logic to determine a similarity measurement between the sender information and a candidate sender record of the one or more sender records. The fuzzy logic can be any of the exemplary fuzzy logic(s) described above. When no sender records associated with the sender public key can be found in block 320 from the preapproved sender database, method 300 can include a block 340 of determining that the sender status is not preauthorized.

In a number of embodiments, method 300 also can include a block 350 of determining, by the system, whether the similarity measurement between the sender information and the candidate sender record is greater than or equal to a predetermined threshold score. When the similarity measurement between the sender information and each candidate sender record of the one or more sender records is less than the predetermined threshold score, method 300 can determine, at block 340, that the sender status is not preauthorized. In a number of embodiments, when the similarity measurement between the sender information and a candidate sender record of the one or more sender records is greater than or equal to the predetermined threshold score, method 300 can include a block 360 of determining that the sender status is preauthorized.

Figure 4:
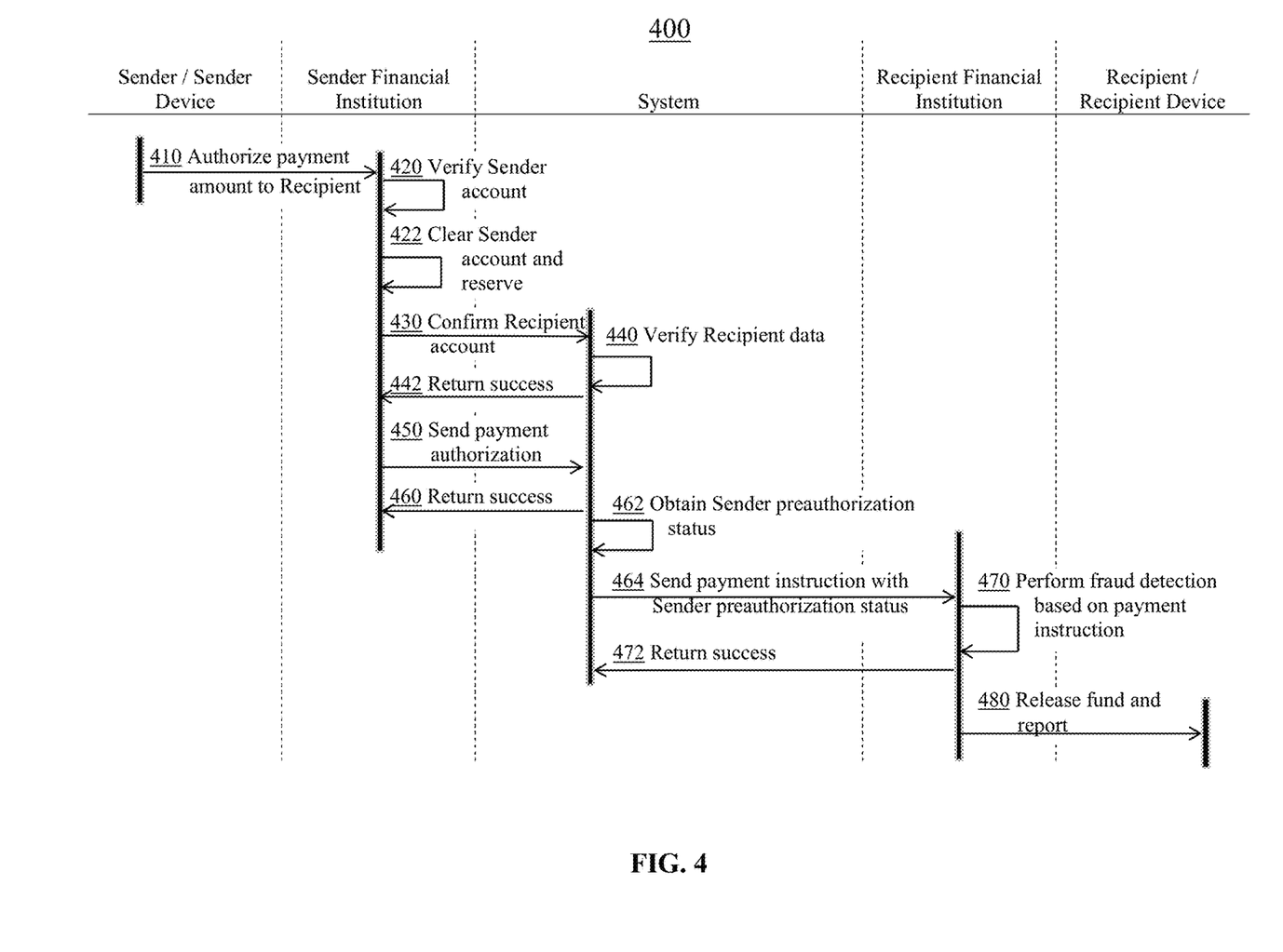
FIG. 4 illustrates a flow chart for a method for verifying recipient information and simplifying fraud detection procedures in real-time payment transactions from trusted accounts, according to yet another embodiment.

Turning ahead in the drawings, FIG. 4 illustrates a flow chart for a method 400, according to an embodiment. In some embodiments, method 400 can be a method of verifying recipient information and simplifying fraud detection procedures in real-time payment transactions by trusted sender accounts. Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the steps, the procedures, the processes, and/or the activities of method 400 can be performed in any suitable order. In still other embodiments, one or more of the procedures, the processes, and/or the activities of method 400 can be combined or skipped. In some embodiments, method 400 can be performed by one or more of system 100 (FIG. 1) and/or system 110. In many embodiments, method 400 can comprise one or more steps identical or similar to one or more steps of method 200, such as blocks 210, 220, 221, 230, 240, 250, and/or 260 (FIG. 2), and/or method 300, such as blocks 310, 320, 330, 340, 350, and/or 360 (FIG. 3).

In many embodiments, method 400 can include a step 410 of sending, by a sender via a sender device and through a computer network, a payment authorization to a sender financial institution. The sender can be similar or identical to sender 151 (FIG. 1). The sender device can be similar or identical to sender device 152 (FIG. 1). The computer network can be similar or identical to network 140 (FIG. 1). The payment authorization here can comprise a payment amount, a recipient account identifier for a recipient account of a recipient, and so forth. The sender financial institution can be similar or identical to sender financial institution 120 (FIG. 1). The recipient account can be similar or identical to recipient account 131 (FIG. 1) and be maintained by a recipient financial institution similar or identical to recipient financial institution 130 (FIG. 1). The recipient can be similar or identical to recipient 154 (FIG. 1).

In a number of embodiments, method 400 can include a step 420 of verifying the sender account by the sender financial institution in real-time after the sender financial institution receives the payment authorization in step 410. Verifying the sender account in step 420 can include determining, by the sender financial institution, that the sender account does not qualify for the payment transaction when at least one of the following: (a) the payment amount is greater than a balance of the sender account; (b) there are one or more outstanding disputes or claims against the sender account; (c) there is a potential overdraw of the sender account in view of the outstanding disputes or claims and the payment amount; and/or (d) the sender is associated with known or potential frauds or bank crimes such as money laundering, etc. When none of the issues above is found, step 420 can include determining, by the sender financial institution, that the payment transaction can proceed to the next stage.

In a number of embodiments, method 400 can include a step 422 of clearing and reserving, by the sender financial institution, the payment amount from the sender account. In some embodiments, the sender financial institution can post the payment amount in a trust account for possibly settling the transaction with the recipient financial institution at a later time, provided that the sender financial institution and the recipient financial institution approve the payment transaction. The later time can be prior to, following, or concurrently with the time when the payment amount is posted to the recipient account. Step 422 can be performed prior to, following, or concurrently with step 420.

In some embodiments, the payment authorization further can comprise recipient information provided by the sender, and method 400 can include a step 430 of requesting, by the sender financial institution via the computer network, a system to confirm the recipient account based on the recipient account identifier and the recipient information of the payment authorization provided by the sender. The system can be similar or identical to one or more of system 100 (FIG. 1) or system 110 (FIG. 1). Step 430 can be performed in real-time after step 410, and/or step 430 can be performed prior to, following, or concurrently with step 420 and/or step 422.

In a number of embodiments, method 400 can include a step 440 of verifying, by the system, the recipient account based on the recipient account identifier and the recipient information. Step 440 can be similar or identical to the one or more steps in block 220 (FIG. 2). In some embodiments, when the recipient account is verified, method 400 can include a step 442 of reporting, by the system, a success status to the sender financial institution. In certain embodiment, step 442 also can include providing, by the system, a recipient verification score determined by the system and the information, associated with the recipient account and maintained by the system, to the sender financial institution for the sender financial institution and/or the sender to further confirm.

In a number of embodiments, method 400 can include a step 450 of sending, by the sender financial institution via the computer network, the payment authorization to the system. Step 450 further can include adding sender information, by the sender financial institution, to the payment authorization before sending the payment authorization to the system. The sender information can comprise a sender public key uniquely associated with the sender account and/or other information associated with the sender, such as a name, an address, a phone number, a tax ID, a social security number, etc. In some embodiments, step 450 can be combined with step 430 and performed after steps 420 and/or 422, if steps 420 and/or 422 are executed.

In a number of embodiments, method 400 can include a step 460 of returning, by the system via the computer network, a success status to the sender financial institution in real-time after the system receives the payment authorization from the sender financial institution.

In a number of embodiments, method 400 can include a step 462 of obtaining, by the system, a sender preauthorization status, based on the sender information of the payment authorization. The sender preauthorization status can be determined by the system or the sender financial institution. Step 462 can be similar or identical to one or more steps in block 230 (FIG. 2) and/or method 300 (FIG. 3). In some embodiments, step 462 further can including determining a similarity measure between the sender information and an associated sender record in a preauthorized sender database. The preauthorized sender database can be similar or identical to database 111 (FIG. 1) or database 112 (FIG. 1). Step 462 can be performed prior to, following, or concurrently with step 460.

In a number of embodiments, method 400 can include a step 464 of sending, by the system via the computer network, a payment instruction to the recipient financial institution. The payment instruction in step 464 can include the payment authorization in its original form from the sender financial institution or revised by the system by adding or deleting some information. For instance, the system can add an identifier of the sender financial institution to the payment authorization and/or remove the sender's personal information such as address or tax ID from the sender information. The payment instruction in step 464 further can include an instruction to the recipient financial institution to bypass a transaction fraud detection mechanism associated with sender accounts for the sender, when the sender preauthorization status is preauthorized. In some embodiments, the payment instruction sent in step 464 also can include the similarity measure obtained in step 462.

In a number of embodiments, method 400 can include a step 470 of performing, by the recipient financial institution, fraud detection based on the payment instruction in real-time upon receiving the payment instruction from the system. When the payment instruction comprises the instruction to bypass a transaction fraud detection mechanism, the recipient financial institution can be configured to skip the transaction fraud detection mechanism associated with sender accounts for the sender associated with the payment instruction. In a number of embodiments, method 400 can include a step 472 of returning, by the recipient financial institution, a success status to the system. Step 472 can be performed prior to, following, or concurrently with step 470.

In a number of embodiments, method 400 can include a step 480 of releasing, by the recipient financial institution, a fund of the payment amount to the recipient account and reporting the release of the fund to a recipient device of the recipient. Releasing the fund in step 470 can be performed prior to or after the fund settlement of the payment amount between the sender financial institution and the recipient financial institution. The recipient device can be similar or identical to recipient device 154 (FIG. 1). Reporting the release of the fund in step 480 can comprise sending an email, SMS text message, a voice message, and/or a push notification to the recipient device. Step 480 can be performed prior to, following, or concurrently with step 472.

Figure 6:
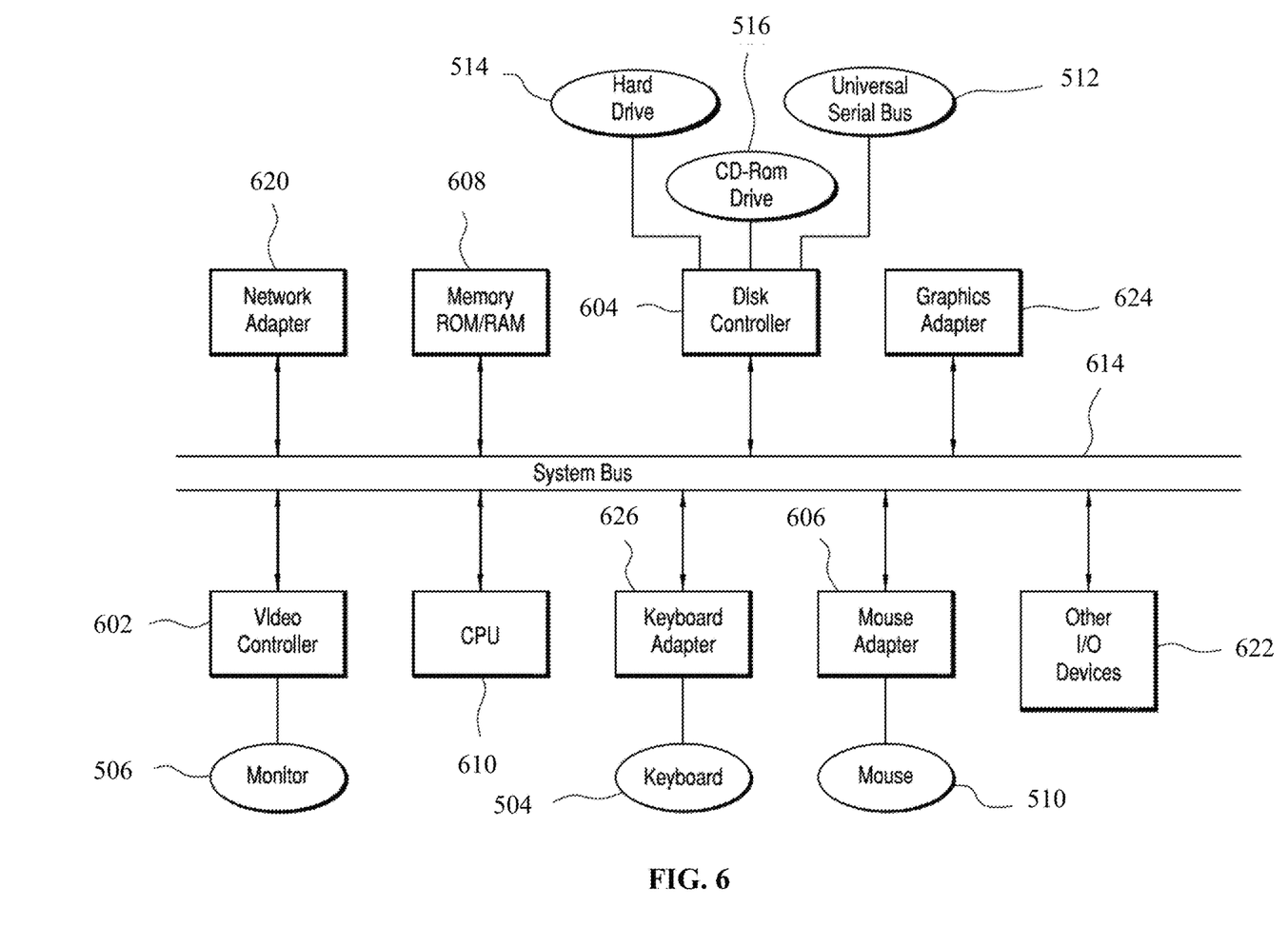
FIG. 6 illustrates a representative block diagram of an example of elements included in circuit boards inside a chassis of the computer of FIG. 5.

Turning ahead in the drawings, FIG. 5 illustrates a computer 500, all of which or a portion of which can be suitable for implementing an embodiment of at least a portion of system 110 (FIG. 1), fund withholding financial institution 120 (FIG. 1), first financial institution 130 (FIG. 1), second financial institution 150 (FIG. 1), sender device 162 (FIG. 1), recipient deice 164 (FIG. 1), fund settling entity 170 (FIG. 1), fund withholding & second financial institution 180 (FIG. 1), and/or the techniques described in method 200 (FIG. 2), method 300 (FIG. 3), and/or method 400 (FIG. 4). Computer 500 includes a chassis 502 containing one or more circuit boards (not shown), a USB (universal serial bus) port 512, a Compact Disc Read-Only Memory (CD-ROM) and/or Digital Video Disc (DVD) drive 516, and a hard drive 514. A representative block diagram of the elements included on the circuit boards inside chassis 502 is shown in FIG. 6. A central processing unit (CPU) 610 in FIG. 6 is coupled to a system bus 614 in FIG. 6. In various embodiments, the architecture of CPU 510 can be compliant with any of a variety of commercially distributed architecture families.

Continuing with FIG. 6, system bus 614 also is coupled to memory 608 that includes both read only memory (ROM) and random access memory (RAM). Non-volatile portions of memory storage unit 608 or the ROM can be encoded with a boot code sequence suitable for restoring computer 500 (FIG. 5) to a functional state after a system reset. In addition, memory 608 can include microcode such as a Basic Input-Output System (BIOS). In some examples, the one or more memory storage units of the various embodiments disclosed herein can comprise memory storage unit 608, a USB-equipped electronic device, such as, an external memory storage unit (not shown) coupled to universal serial bus (USB) port 512 (FIGS. 5-6), hard drive 514 (FIGS. 5-6), and/or CD-ROM or DVD drive 516 (FIGS. 5-6). In the same or different examples, the one or more memory storage units of the various embodiments disclosed herein can comprise an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Some examples of common operating systems can comprise Microsoft® Windows® operating system (OS), Mac® OS, UNIX® OS, and Linux® OS.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 610.

In the depicted embodiment of FIG. 6, various I/O devices such as a disk controller 604, a graphics adapter 624, a video controller 602, a keyboard adapter 626, a mouse adapter 606, a network adapter 620, and other I/O devices 622 can be coupled to system bus 614. Keyboard adapter 626 and mouse adapter 606 are coupled to a keyboard 504 (FIGS. 5-6) and a mouse 510 (FIGS. 5-6), respectively, of computer 500 (FIG. 5). While graphics adapter 624 and video controller 602 are indicated as distinct units in FIG. 6, video controller 602 can be integrated into graphics adapter 624, or vice versa in other embodiments. Video controller 602 is suitable for refreshing a monitor 506 (FIGS. 5-6) to display images on a screen 508 (FIG. 5) of computer 500 (FIG. 5). Disk controller 604 can control hard drive 514 (FIGS. 5-6), USB port 512 (FIGS. 5-6), and CD-ROM or DVD drive 516 (FIGS. 5-6). In other embodiments, distinct units can be used to control each of these devices separately.

In some embodiments, network adapter 620 can comprise and/or be implemented as a WNIC (wireless network interface controller) card (not shown) plugged or coupled to an expansion port (not shown) in computer system 500 (FIG. 5). In other embodiments, the WNIC card can be a wireless network card built into computer system 500 (FIG. 5). A wireless network adapter can be built into computer system 500 (FIG. 5) by having wireless communication capabilities integrated into the motherboard chipset (not shown), or implemented via one or more dedicated wireless communication chips (not shown), connected through a PCI (peripheral component interconnector) or a PCI express bus of computer system 500 (FIG. 5) or USB port 512 (FIG. 5). In other embodiments, network adapter 620 can comprise and/or be implemented as a wired network interface controller card (not shown).

Although many other components of computer 500 (FIG. 5) are not shown, such components and their interconnection are well known to those of ordinary skill in the art. Accordingly, further details concerning the construction and composition of computer 500 and the circuit boards inside chassis 502 (FIG. 5) need not be discussed herein.

When computer 500 in FIG. 5 is running, program instructions stored on a USB drive in USB port 512, on a CD-ROM or DVD in CD-ROM and/or DVD drive 516 (FIG. 5), on hard drive 514 (FIG. 5), or in memory 608 (FIG. 6) are executed by CPU 610 (FIG. 6). A portion of the program instructions, stored on these devices, can be suitable for carrying out all or at least part of the techniques described herein. In various embodiments, computer 500 (FIG. 5) can be reprogrammed with one or more modules, applications, and/or databases to convert a general purpose computer to a special purpose computer.

Although computer system 500 is illustrated as a desktop computer in FIG. 5, there can be examples where computer system 500 may take a different form factor while still having functional elements similar to those described for computer system 500. In some embodiments, computer system 500 may comprise a single computer, a single server, or a cluster or collection of computers or servers, or a cloud of computers or servers. Typically, a cluster or collection of servers can be used when the demand on computer system 500 exceeds the reasonable capability of a single server or computer. In certain embodiments, computer system 500 may comprise a portable computer, such as a laptop computer. In certain other embodiments, computer system 500 may comprise a mobile device, such as a smartphone. For example, sender device 152 (FIG. 1) or recipient device 154 (FIG. 1) can be a mobile device, such as a smartphone. In certain additional embodiments, computer system 500 may comprise an embedded system.

Although real-time payment transactions with simplified fraud detection have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments. For example, one or more of the procedures, processes, or activities of FIGS. 2-4 may include different procedures, processes, and/or activities and be performed by many different systems, subsystems, or modules, in many different orders. One or more of the procedures, processes, or activities of FIGS. 2-4 may include one or more of the procedures, processes, or activities of another different one of FIGS. 2-4.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
    one or more processors; and
    one or more non-transitory computer-readable media storing computing instructions, that when run on the one or more processors, cause the one or more processors to perform:
        receiving a payment authorization, through a network, from a sender financial institution, wherein:
            the payment authorization comprises a payment amount, a recipient account identifier for a recipient account, and sender information associated with a sender for the payment authorization; and
            the recipient account is maintained by a recipient financial institution;
        obtaining, in real-time after receiving the payment authorization, a sender status based on the sender information, comprising:
            using fuzzy logic to determine an associated sender record of one or more sender records in a preapproved sender database that matches the sender information based on a respective overall similarity measurement between the sender information and one or more of the one or more sender records, comprising:
                determining, via a linguistic interpreter of the fuzzy logic, first respective similarity measurements between corresponding non-numerical attributes of the sender information and the one or more of the one or more sender records;

determining, via a mathematical module of the fuzzy logic, second respective similarity measurements between corresponding numerical attributes of the sender information and the one or more of the one or more sender records; and determining, via the fuzzy logic, the respective overall similarity measurement for the one or more of the one or more sender records based on the first respective similarity measurements and the second respective similarity measurements for the one or more of the one or more sender records; and when the associated sender record matching the sender information is found, determining that the sender status is preauthorized;

when the sender status is preauthorized, instructing, through the network and in real-time after obtaining the sender status, the recipient financial institution to bypass a transaction fraud detection mechanism associated with the sender; and instructing, through the network, the recipient financial institution to post the payment amount to the recipient account in real-time.

2. The system in claim 1, wherein obtaining the sender status further comprises:

when the associated sender record matching the sender information is not found, determining that the sender status is not preauthorized.

3. The system in claim 1, wherein:

the sender information further comprises a sender public key; and using the fuzzy logic to determine the associated sender record further comprises:

when a candidate sender record of the one or more of the one or more sender records is associated with the sender public key:

using the candidate sender record as the associated sender record; and determining that the associated sender record matching the sender information is found; and when none of the one or more of the one or more sender records is associated with the sender public key, determining that the associated sender record matching the sender information is not found.

4. The system in claim 1, wherein using the fuzzy logic to determine the associated sender record further comprises:

when the respective overall similarity measurement between the sender information and a candidate sender record of the one or more of the one or more sender records is not less than a predetermined threshold score:

using the candidate sender record as the associated sender record; and determining that the associated sender record matching the sender information is found; and when the respective overall similarity measurement between the sender information and the one or more of the one or more sender records is less than the predetermined threshold score, determining that the associated sender record matching the sender information is not found.

5. The system in claim 4, wherein instructing the recipient financial institution to bypass the transaction fraud detection mechanism associated with the sender further comprises:

transmitting, via the network, the respective overall similarity measurement between the sender information and the associated sender record to the recipient financial institution.

6. The system in claim 1, wherein:

instructing the recipient financial institution to bypass the transaction fraud detection mechanism associated with the sender does not affect whether the recipient financial institution performs another transaction fraud detection mechanism not associated with the sender.

7. The system in claim 1, wherein:

the payment authorization further comprises recipient information; and the computing instructions, when run on the one or more processors, further cause the one or more processors to perform:

determining, in real-time after receiving the payment authorization, a recipient verification score based on the recipient information and a user record associated with the recipient account identifier; and when the recipient verification score is below a predetermined threshold score, reporting an error message to the sender financial institution.

8. The system in claim 7, wherein:

the user record is at least one of:

maintained by the system; or obtained by the system in real-time after receiving the payment authorization, via the network, from the recipient financial institution.

9. The system in claim 7, wherein:

determining the recipient verification score comprises applying the fuzzy logic to determine a similarity measurement between the recipient information and the user record.

10. The system in claim 1, wherein the computing instructions, when run on the one or more processors, further cause the one or more processors to perform:

submitting, via the network, the recipient account identifier and recipient information of the payment authorization to the recipient financial institution; and requesting, via the network, a recipient verification result from the recipient financial institution.

11. A method being implemented via execution of computing instructions configured to run at one or more processors and stored at one or more non-transitory computer-readable media, the method comprising:

receiving a payment authorization, through a network, from a sender financial institution, wherein:

the payment authorization comprises a payment amount, a recipient account identifier for a recipient account, and sender information associated with a sender for the payment authorization; and the recipient account is maintained by a recipient financial institution;

obtaining, in real-time after receiving the payment authorization, a sender status based on the sender information, comprising:

using fuzzy logic to determine an associated sender record of one or more sender records in a preapproved sender database that matches the sender information based on a respective overall similarity measurement between the sender information and one or more of the one or more sender records, comprising:

determining, via a linguistic interpreter of the fuzzy logic, first respective similarity measurements between corresponding non-numerical attributes of the sender information and the one or more of the one or more sender records;

determining, via a mathematical module of the fuzzy logic, second respective similarity measurements between corresponding numerical attributes of the sender information and the one or more of the one or more sender records; and determining, via the fuzzy logic, the respective overall similarity measurement for the one or more of the one or more sender records based on the first respective similarity measurements and the second respective similarity measurements for the one or more of the one or more sender records; and when the associated sender record matching the sender information is found, determining that the sender status is preauthorized;

when the sender status is preauthorized, instructing, through the network and in real-time after obtaining the sender status, the recipient financial institution to bypass a transaction fraud detection mechanism associated with the sender; and instructing, through the network, the recipient financial institution to post the payment amount to the recipient account in real-time.

12. The method in claim 11, wherein obtaining the sender status further comprises:

when the associated sender record matching the sender information is not found, determining that the sender status is not preauthorized.

13. The method in claim 11, wherein:
the sender information comprises a sender public key; and
using the fuzzy logic to determine the associated sender record further comprises:
when a candidate sender record of the one or more of the one or more sender records is associated with the sender public key:
using the candidate sender record as the associated sender record; and
determining that the associated sender record matching the sender information is found; and
when none of the one or more of the one or more sender records is associated with the sender public key, determining that the associated sender record matching the sender information is not found.

14. The method in claim 11, wherein using the fuzzy logic to determine the associated sender record further comprises:
when the respective overall similarity measurement between the sender information and a candidate sender record of the one or more of the one or more sender records is not less than a predetermined threshold score:
using the candidate sender record as the associated sender record; and determining that the associated sender record matching the sender information is found; and when the respective overall similarity measurement between the sender information and the one or more of the one or more sender records is less than the predetermined threshold score, determining that the associated sender record matching the sender information is not found.

15. The method in claim 14, wherein instructing the recipient financial institution to bypass the transaction fraud detection mechanism associated with the sender further comprises:
transmitting, via the network, the respective overall similarity measurement between the sender information and the associated sender record to the recipient financial institution.

16. The method in claim 11, wherein:
instructing the recipient financial institution to bypass the transaction fraud detection mechanism associated with the sender does not affect whether the recipient financial institution performs another transaction fraud detection mechanism not associated with the sender.

17. The method in claim 11, wherein:
the payment authorization further comprises recipient information; and
the method further comprises:
determining, in real-time after receiving the payment authorization, a recipient verification score based on the recipient information and a user record associated with the recipient account identifier; and
when the recipient verification score is below a predetermined threshold score, reporting an error message to the sender financial institution.

18. The method in claim 17 further comprising:
obtaining the user record by at least one of:
retrieving the user record from a database based on the recipient account identifier; or
requesting, via the network, the user record from the recipient financial institution based on the recipient account identifier.

19. The method in claim 17, wherein:
determining the recipient verification score comprises applying the fuzzy logic to determine a similarity measurement between the recipient information and the user record.

20. The method in claim 11 further comprising:
submitting, via the network, the recipient account identifier and recipient information of the payment authorization to the recipient financial institution; and
requesting, via the network, a recipient verification result from the recipient financial institution.

* * * * *